June 21, 1927.

G. P. GREGORY

FLOAT GAUGE

Filed Nov. 23, 1925

1,633,322

INVENTOR:
George P. Gregory
Robt P. Harris
BY
ATTORNEY

Patented June 21, 1927.

1,633,322

UNITED STATES PATENT OFFICE.

GEORGE P. GREGORY, OF PITTSFIELD, MASSACHUSETTS, ASSIGNOR TO THE BOSTON AUTO GAGE COMPANY, OF PITTSFIELD, MASSACHUSETTS, A CORPORATION OF MASSACHUSETTS.

FLOAT GAUGE.

Application filed November 23, 1925. Serial No. 70,913.

This invention relates to float actuated gauges for indicating the height of the liquid in a tank.

Gauges of various different constructions have been proposed heretofore to indicate the height of the liquid in a tank, and these gauges as usually constructed have an indicating needle that swings over the face of a graduated disk or dial and are designed to be read from a position directly in front of the gauge, but can not be read from a position at one side of the gauge.

In installing gauges of the type just mentioned, it frequently occurs that if these gauges are mounted in the upper wall or top of a tank they cannot be observed from a position directly above the gauge to note their reading, due to the fact that the gauge may be above the line of vision, or it may be obscured by a wall or other object.

To meet this condition it is desirable to provide a gauge which while mounted at the top or upper end of a tank may be read from a position at one side of the gauge, and one important feature of the invention therefore resides in a float gauge which is constructed so that it may be read from a position at one side of the gauge.

A gauge constructed in accordance with the present invention is well adapted for use upon a tank the upper end or wall of which lies about on a level with the eyes of the observer, but it may be desirable to note the reading of the gauge from either side of the tank; another feautre of the invention therefore resides in a gauge which is provided with corresponding indicating means at its opposite sides so that the height of the liquid within the tank may be read from either side of the gauge.

Still another feature of the present invention resides in the float operating means for the gauge and the construction of the float and its supporting frame.

Other features of the invention and novel combination of parts in addition to the above will be hereinafter described in connection with the accompanying drawings which illustrate one good practical form of the invention.

In the drawings:

Fig. 1 is a vertical sectional view thru a tank having a gauge constructed in accordance with the present invention mounted therein;

Fig. 2 on an enlarged scale is a vertical sectional view thru the gauge of Fig. 1;

Figure 1:
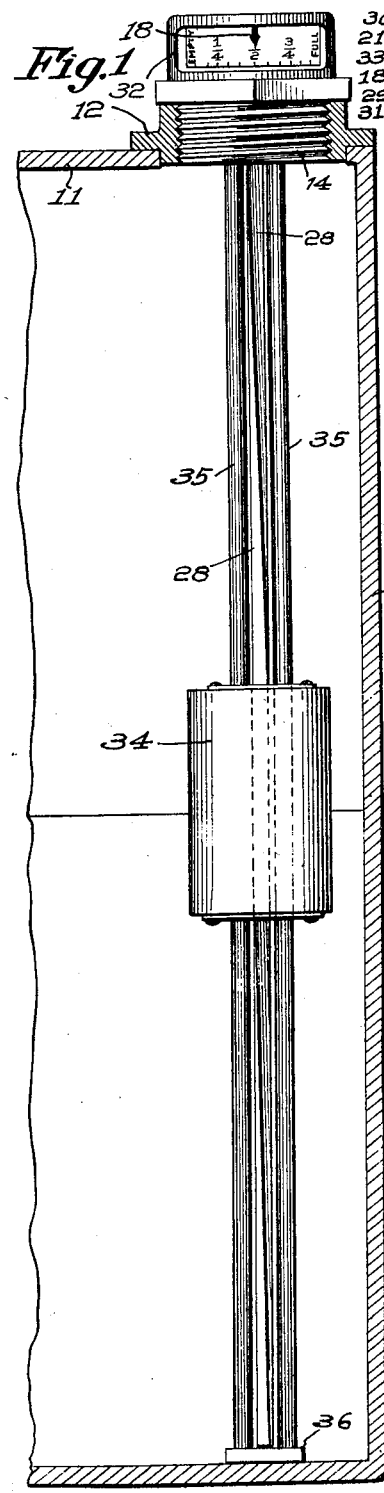

In the drawings 10 designates a tank having a gauge of the present invention associated therewith to indicate the height of the liquid within the tank, and the top or the upper wall 11 of the tank is provided with a gauge receiving opening as usual in which the internally threaded collar 12 is mounted and this collar as usual may be braised, soldered or otherwise rigidly secured to the upper wall of the tank.

In the embodiment of the inventon illustrated the gauge is provided with a head 13 which preferably has substantially the form of an inverted cup, and the lower portion of the head 13 is threaded as at 14 to engage the threads within the collar 12, and the head preferably has a hexagonal portion 15 adapted to be gripped by a wrench to screw the head tightly into the collar 12. The upper end portion of the cup-shaped head 13 is preferably reduced in its external diameter as at 16, to provide a space in which the downwardly bent ends of the indicating needle may swing, as will presently appear.

As above pointed out, the present invention relates to a float operated gauge which is constructed so that the reading of the gauge may be observed at either side thereof instead of from a position directly over the gauge, as has been customary heretofore. The gauge shown is of the type in which the indicating needle is rotated by a bar magnet supported in spaced relation to the needle, this construction being highly desirable because it permits the provision of a gas-tight wall between the indicating needle and the actuating means therefor.

In the construction shown the indicating needle 17 is mounted at the upper end of the cup-shaped head 13, and is provided with the downwardly extending end portions 18 which lie substantially parallel to the annular wall of the reduced portion 16. In order that the needle 17 may rotate with a minimum amount of friction the needle may be provided with the usual central socket 19 adapted to receive the supporting pin 20 projecting upwardly from the upper wall 21 of the cup-shaped head, and the upper wall 21 is shown as provided with a clearance space 22 which is cut away to clear the pin receiving portion 19 of the needle.

In the construction shown a bar magnet 23 is rotatably mounted in the upper portion of the head 13. Various means might be provided for rotatably supporting the magnet 23 in the upper portion of the head 13, and the means shown to this end consists of a disk 24 having a central, upwardly extending portion 25 and an outer annular flange portion 26 which is snugly fitted within the head 13 and may be sweated or otherwise rigidly secured in place. The central, upwardly extending portion 25 forms a bearing in which the reduced upper end 27 of the operating rod 28 is journaled and the bar magnet 23 is rigidly secured to the upper end portion 27 of the operating rod. The construction of the disk 24 is such that it may be readily formed of sheet metal while at the same time it affords a central bearing of substantial length.

The gauge head 13 is preferably formed of brass, aluminum or other nonmagnetic material which will not interfere with the action of the magnet 23 upon the downwardly extending end portions 18 of the needle, so that as the magnet is rotated the needle will follow the movement of the magnet in a well known manner.

Figure 2:
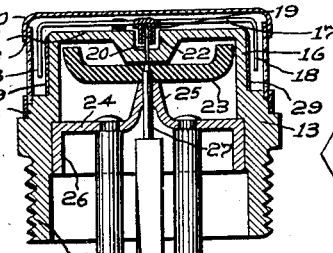
Figure 3:
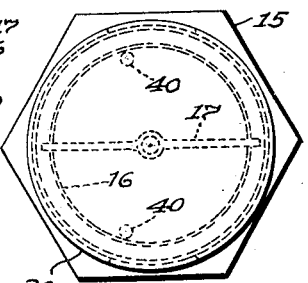
Fig. 3 is a top plan view of Fig. 2.
Figure 4:
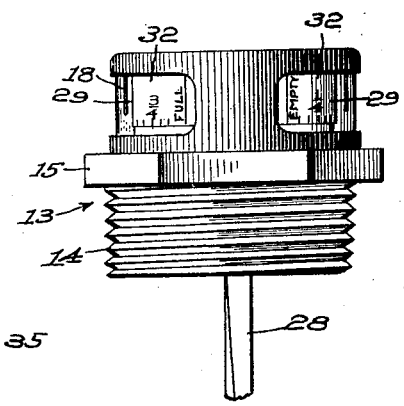
Fig. 4 is a side view of a gauge head showing the sight windows at the opposite sides of the head.
Figure 5:
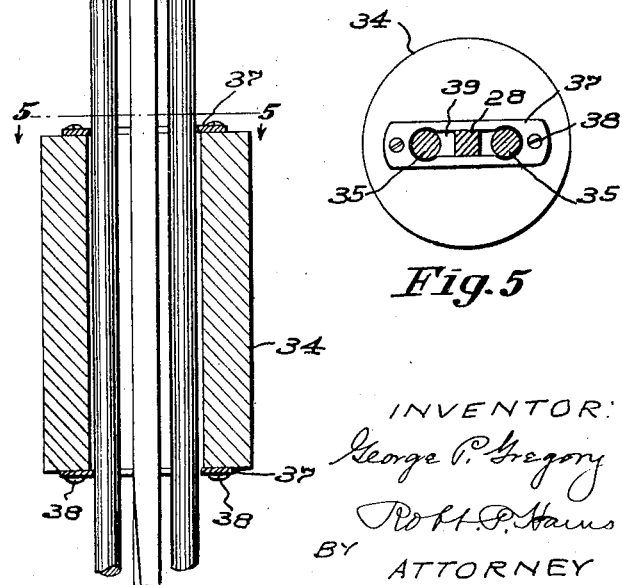
Fig. 5 is a sectional view taken on the line 5—5 of Fig. 2.

The graduations with which the ends of the needle cooperate may be painted or otherwise provided on the outer curved wall of the reduced portion 16 of the head, and in order that the reading of the gauge may be observed from its opposite sides the graduated scales 29 are provided with similar graduations or markings at the opposite sides of the head. It is desirable to provide the gauge with a cap or casing to protect the operating needle, and to this end the cup-shaped cap 30 is provided which encloses the upper end portion of the head 13, and the lower end portion of this cap may snugly embrace the shouldered portion 31 of the head, as will be apparent from Fig. 2. The cap 30 is provided in its opposite side walls with the sight openings 32 which may be provided with the transparent sheet 33 of cellulose or the like secured to the inner annular wall of the cap over the sight openings. As a result of the construction just described the movement of one end of the needle 17 over its dial 29 may be observed at one side of the gauge head, and the movement of the other end of the needle over a similarly graduated dial may be observed at the opposite side of the gauge head.

Various means might be provided for supporting the operating float 34 so that it will rotate the magnet 23 to correspond with the rise and fall of the liquid within the tank 10, and in the construction shown a float supporting frame is provided consisting of the spaced bars 35 which extend thru a central opening within the float 34. The upper ends of the bars 35 are rigidly secured to the supporting plate 24, as clearly shown in Fig. 2, and the lower ends of these bars are connected by a bridge plate 36. The operating rod 28 is twisted as shown and lies between the spaced bars 35 which protect it, and the lower end of this rod is journaled in the bridge plate 36. Since it is necessary that the float 34 be free to travel thruout the entire height of a tank, in order to indicate the various positions of the liquid therein, the float supporting frame must have a length substantially equal to the depth of the tank 10, and if the tank is quite deep the bars 35 must be relatively long, in which case they may be readily sprung apart. By passing the bars 35 thru the float as shown they are prevented from being sprung apart out of engagement with the float.

In order to reduce the friction between the float and bars, the bars are prevented from coming in actual contact with the inner bore of the float and to this end plates 37 are secured to the opposite ends of the float by screws or the like 38 and each of these plates is provided with an elongated opening 39 adapted to slidably receive the guide bars 35. The side walls of the openings 39 in these plates engage the twisted operating rod 28, so that as the float moves up and down with the changes in the level of the liquid within the tank it will be prevented from rotating by the guide bars 25, but will impart rotative movement to the twisted rod 28.

Since, as above stated, each end of the needle 17 cooperates with a different graduated scale or dial, each of these scales should extend less than half way around the gauge head and the float operating means should be so constructed that it will impart a rotative movement to the magnet 23 thru an angle of less than 180° thruout the entire range of float movement; but this may be readily accomplished by giving the desired twist to the rod 28. Should it be desired to limit the angle thru which the needle 17 may swing this is readily accomplished by providing stops in the form of pads or pins 40 projecting upwardly from the upper end of the casing 13.

From the above description and accompanying drawings it will be seen that the present gauge is extremely simple in construction and is inexpensive to manufacture, and that since the reading of the gauge may be observed from a point at one side thereof, it is particularly well adapted for use in tanks where it is not practical to look directly down upon the gauge to observe its reading.

By constructing the gauge so that its reading may be observed from either side thereof, the gauge head may be more easily adjusted to its tank than in the constructions employed heretofore because in screwing the gauge head tightly in place difficulty may be experienced in causing the graduated portion of the gauge to face in the desired direction as the threaded portion of the head is screwed home, but since, in the present construction, the opposite sides of the gauge head are similarly graduated, this difficulty is materially reduced.

What is claimed is:

1. A gauge for indicating the height of liquid in a tank and constructed to be read from either side of the gauge, comprising in combination, a gauge head adapted to be secured to a tank and having similar sets of graduations at the opposite sides of said head, a magnet rotatably mounted in the head, float operated means for rotating the magnet through an angle of not over 180° during the entire range of float movement, a needle pivotally mounted outside of the head and having its opposite ends bent downwardly to form pointers that lie along the opposite sides of the head to swing over said graduations that the reading of the gauge may be observed at either side of the gauge head.

2. A gauge for indicating the height of liquid in a tank and constructed to be read from points at either side of the gauge, comprising in combination, a hollow gauge head adapted to be mounted at the upper end of a tank and having one set of graduations at one side of the head and another set of graduations at the opposite side of the head, a bar magnet rotatably mounted in the head, float operated means for rotating the magnet, a needle pivotally supported by said head above the magnet and at the outside of the hollow head and having its ends bent downwardly at the opposite sides of the head so that they lie opposite the ends of the magnet and form pointers which cooperate with the different sets of graduations, and a cap enclosing the upper portion of the head to house the needle and having sight openings at the opposite sides of the head thru which the pointers may be observed that the indication of the gauge may be read from either side thereof.

3. A gauge for indicating the height of liquid in a tank, comprising a gauge head having the form of an inverted cup and adapted to be secured to the upper wall of the tank, an indicator needle pivotally mounted upon the gauge head, a bar magnet rotatably mounted in the gauge head to rotate the needle, a disk formed of sheet material and rigidly secured in the gauge head to support the magnet and provided with a central upwardly bulging portion which forms a shaft receiving bearing of substantial length, and float means for operating the magnet including a float supporting frame comprising spaced bars rigidly secured to and supported by said disk, a float having sliding engagement with said bars, a twisted rod supported by the bars to be rotated by the vertical movement of the float and having its upper end journaled in said bearing, and means connecting the rod to the magnet to rotate the latter.

In testimony whereof, I have signed my name to this specification.

GEORGE P. GREGORY.